United States Patent [19]

Richardson

[11] Patent Number: 5,223,320
[45] Date of Patent: Jun. 29, 1993

[54] PERFORATED TWO LAYERED SHEET FOR USE IN FILM COOLING

[75] Inventor: John S. Richardson, Derby, England

[73] Assignee: Rolls-Royce plc, London, England

[21] Appl. No.: 708,864

[22] Filed: May 30, 1991

[30] Foreign Application Priority Data

Jun. 5, 1990 [GB] United Kingdom ............ 9012531

[51] Int. Cl.$^5$ .......................... F02C 7/12; B32B 3/24
[52] U.S. Cl. ................................. 428/137; 428/131; 428/136; 428/213; 428/596; 428/212; 416/97 A; 416/97 R; 60/754; 60/755; 156/253; 156/252
[58] Field of Search ............ 428/137, 131, 136, 213, 428/596, 212; 60/754, 755; 416/97 A, 97 R; 156/253, 252

[56] References Cited

U.S. PATENT DOCUMENTS

| | | | |
|---|---|---|---|
| 2,657,531 | 11/1953 | Pierce | 60/755 |
| 3,584,972 | 6/1971 | Bratkovich | 428/167 |
| 4,004,056 | 1/1977 | Carroll | 428/138 |
| 4,022,542 | 5/1977 | Barbeau | 416/97 A |
| 4,168,348 | 9/1979 | Bhangu et al. | 60/754 |
| 4,302,940 | 12/1981 | Meginnis | 60/754 |
| 4,315,406 | 2/1982 | Bhangu et al. | 428/137 |
| 4,422,300 | 12/1983 | Dierberger et al. | 60/754 |
| 4,487,550 | 12/1984 | Horvath et al. | 416/97 A |
| 4,695,247 | 9/1987 | Enzaki et al. | 60/755 |
| 4,738,588 | 4/1988 | Field | 416/97 R |

FOREIGN PATENT DOCUMENTS

| | | |
|---|---|---|
| 2635577 | 2/1990 | France . |
| 493803 | 7/1970 | Switzerland . |
| 1226272 | 3/1971 | Switzerland . |
| 2049152 | 12/1980 | United Kingdom . |
| 2066372 | 7/1981 | United Kingdom ............ 416/97 A |
| 2221979 | 2/1990 | United Kingdom . |

OTHER PUBLICATIONS

Patent Abstract of Japan vol. 9, No. 158 (M-393) (1881) 3 Juillet 1985 & JP-A-60 032 903 (Kogyo Gijutsuin).
Search Report, Feb. 17, 1992.

Primary Examiner—Ellis P. Robinson
Assistant Examiner—William P. Watkins, III
Attorney, Agent, or Firm—Cushman, Darby & Cushman

[57] ABSTRACT

A perforated sheet for the promotion of film cooling a gas turbine engine comprises two separate layers of laminate material which are placed in superposed abutting relationship. The first layer has a plurality of apertures of given cross-sectional area therein. The second layer also has a plurality of apertures therein which have larger cross-sectional areas than the corresponding apertures in the first layer. The apertures in the first layer are in fluid communication with the apertures in the second layer to form passageways through the perforated sheet. These passageways permit a cooling flow of fluid to pass through the perforated sheet so it can be discharged as a cooling fluid film along the inner surface of the perforated sheet. The apertures in each layer are independently formed to produce the passageways. The apertures can easily be machined to the desired size, shape, and angle to optimize the cooling film effectiveness for any particular application.

9 Claims, 1 Drawing Sheet

PERFORATED TWO LAYERED SHEET FOR USE IN FILM COOLING

FIELD OF THE INVENTION

The present invention relates to a perforated sheet which promotes film cooling and to a method of making such a perforated sheet. The invention particularly relates to the use of such perforated sheets in a combustion chamber of a gas turbine engine.

DESCRIPTION OF THE PRIOR ART

It is known to cool the walls of a combustion chamber of a gas turbine engine by film cooling. A film of cooling air is allowed to flow along the inside of the combustion chamber walls which acts to insulate the walls from the hot combustion gases within the combustion chamber.

A conventional method of film cooling the combustion chamber walls involves passing a flow of cooling air through a plurality of cylindrical apertures in the walls. Air flows through the cylindrical apertures in the combustion walls and discharges along its inner surface to form a film of cooling air. With this method of film cooling the air discharging from the apertures has a high velocity which is detrimental to forming an effective cooling film. The high velocity of the discharging air causes the film to break away from the inner surface of the combustion chamber walls. Heating of the inner surface of the combustion chamber walls can result as the hot combustion gases are able to come into contact with the inner surface.

Improved film cooling has been achieved using fan shaped cooling apertures in the combustion chamber walls. Each aperture has an initial cylindrical portion and a divergent portion through which the air exits along the inner wall of the combustion chamber. The divergent portion of the fan shaped apertures can reduce the velocity of the air discharging therefrom so a more effective film of cooling air is formed. The width of the air film from each fan shaped aperture also increases so that a reduced amount of air can be used to cool a given surface. The divergent portion of the apertures may be angled to ensure the cooling film remains on the inner surfaces of the combustion chamber walls.

Fan shaped cooling apertures form an effective cooling film but are difficult and time consuming to manufacture and specialist manufacturing techniques need to be employed.

SUMMARY OF THE INVENTION

The present invention seeks to provide a perforated sheet which promotes effective film cooling whilst being relatively easy to manufacture.

According to the present invention, a perforated sheet for the promotion of film cooling comprises a first and a second layer of laminate material, each layer having a plurality of apertures therein, the first and second layers being in superposed abutting relationship so that each of the apertures in the first layer are in fluid communication with the an at least one aperture in the second layer to form passageways through the perforated sheet, the cross-sectional areas of each of the apertures in the second layer being larger than the cross-sectional area of the aperture in the first layer with which it corresponds.

Preferably the aperture in the first and second layers of laminate material may have parallel sides.

The first and second layers of laminate material may be of different thicknesses and are preferably bonded together to give good thermal conduction between the layers.

The apertures in the first layer of laminate material may be angled so as to operationally control a mass flow of cooling fluid therethrough. Similarly the apertures in the second layer of laminate material may be angled to control the angle at which the cooling fluid flow is operationally discharged therefrom.

A method of making a perforated sheet for the promotion of film cooling comprises the steps of, producing a plurality of apertures of given cross-sectional areas in a predetermined pattern in a laminate material, producing a plurality of apertures in a corresponding pattern in a second layer of a laminate material, the apertures in the second layers having larger cross-sectional areas than those of corresponding apertures in the first layer, placing the two layers of laminate material in superposed abutting relationship so that each of the apertures in the first layer are in fluid communication with at least one of the corresponding apertures in the second layer to form passageways through the perforated sheet.

BRIEF DESCRIPTION OF THE DRAWINGS

The present invention will now be described by way of example and with reference to the accompanying drawings in which.

DETAILED DESCRIPTION OF THE INVENTION

Figure 1:
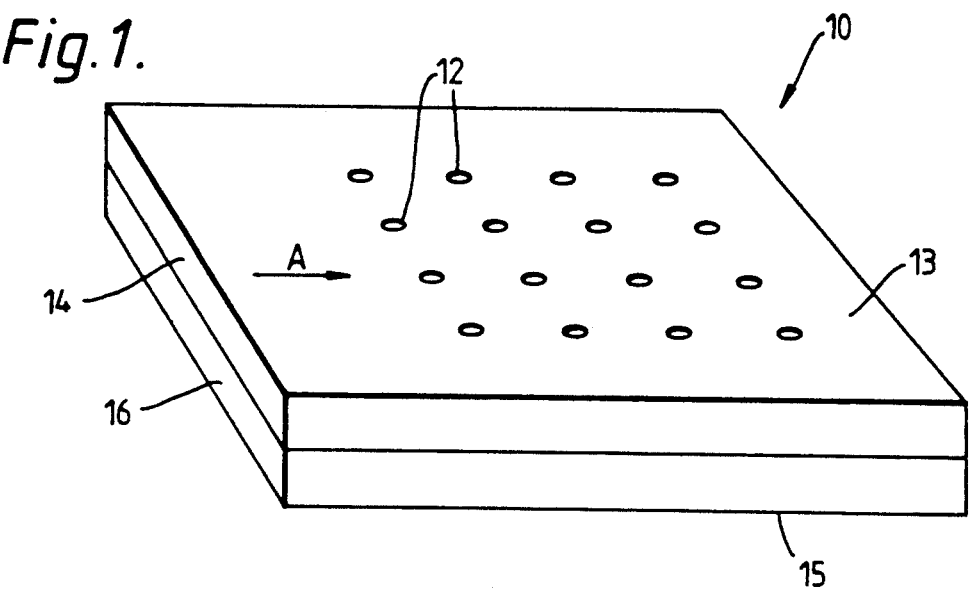
FIG. 1 shows a pictorial view of a perforated sheet which forms part of a combustion chamber wall in accordance with the present invention.

FIG. 1 a perforated sheet 10 which forms part of a combustion chamber wall has a plurality of passageways 12 extending therethrough. The passageways 12 permit a flow of cooling air to pass from an outer surface 13 to an inner surface 15 of the perforated sheet 10. The flow of cooling air discharges from the passageways 12 to form a cooling film of air on the inner surface 15 of the perforated sheet 10. The passageways 12 are arranged in a predetermined pattern which ensures a uniform film of cooling air is formed over the inner surface 15. The cooling film of air discharged over the inner surface 15 acts as a barrier to prevent hot combustion gases or the like contacting the inner wall 15.

The perforated sheet 10 comprises two separate layers 14 and 16 of a laminate material which are in superposed abutting relationship. In the embodiments shown in FIGS. 2 and 3 the two layers of laminate material 14 and 16 are of equal thickness, although it will be appreciated that the thickness of each layer can be varied in accordance with the particular application of the perforated sheet 10. Each of the layers 14 and 16 has a plurality of apertures 12a and 12b therein. The apertures 12a and 12b in the layers 14 and 16 respectively, are arranged relative to one another so that they are in fluid communication when the two layers 14 and 16 are superposed in an abutting relationship. The two layers of laminate material 14 and 16 are then bonded together to ensure there is good thermal conduction between them. The apertures 12a and 12b communicate with one another to form passageways 12 through the perforated sheet 10.

Figure 2:
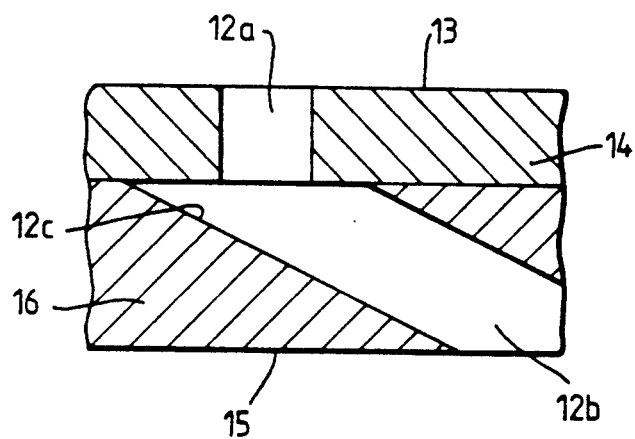
FIG. 2 is a cross-sectional view of a portion of a perforated sheet which forms part of a combustion chamber wall in accordance with one embodiment of the present invention.

In the embodiment shown in FIG. 2, the first layer 14 of laminate material has a plurality of apertures 12a, which are normal to the surface 13, extending therethrough. The second layer 16 also has a plurality of apertures 12b extending therethrough, which are of larger cross-sectional areas than the corresponding apertures 12a in the first layer 14. The apertures 12b in the second layer 16 are angled with respect to the surface 15 so as to direct the air discharging therefrom in a downstream direction with respect to the flow of combustion products over the sheet 10. Directing the discharging air in a downstream direction encourages the air film which is formed to adhere to the inner surface 15 of the perforated sheet 10. It will be appreciated by one skilled in the art that the angle of the apertures 12b can be varied to control the angle at which the air discharges to optimise the film effectiveness for a particular application.

In operation a flow of air flows in the direction indicated by arrow A along the outer surface 13 of the perforated sheet 10. A proportion of the air flows through aperture 12a to the larger aperture 12b where it is diffused. Diffusing the air causes a decrease in its velocity to occur. By reducing the velocity, the air discharging from the apertures 12b has an increased tendency to adhere to the inner surface 15 so that an effective cooling air film is formed on the inner surface 15. The width of the air film from the apertures 12b also increases so that a reduced amount of air can be used to cool the inner surface 15.

A further advantage of the embodiment shown in FIG. 2, is that the air passing through the apertures 12a to the larger apertures 12b impinges on the inner wall 12c of the aperture 12b. This results in impingement cooling of the wall 12c which further enhances the cooling effectiveness of the airflow passing through the perforated sheet 10.

Figure 3:
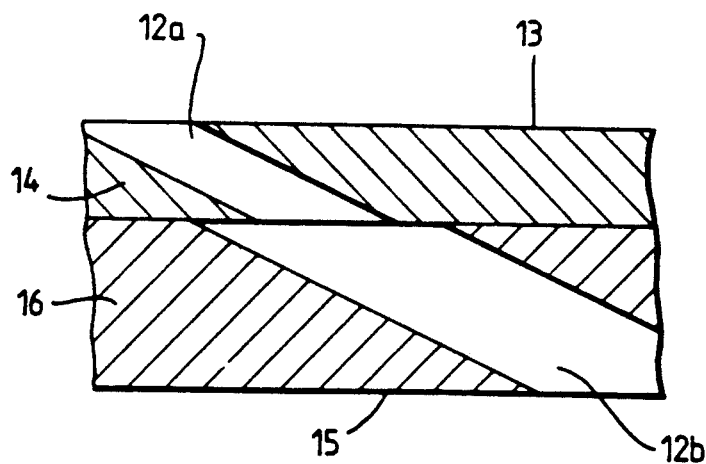
FIG. 3 is a cross-sectional view of a portion of a perforated sheet which forms part of a combustion chamber wall in accordance with a further embodiment of the present invention.

FIG. 3 shows a further embodiment of the present invention in which the apertures 12a in the first laminate layer 14 are angled with respect to the surface 13. The inlet of the aperture 12a on the surface 13 is directed in an upstream direction to allow a greater proportion of air flow to pass therethrough. It will be appreciated by one skilled in the art that the angle of the apertures 12a can be varied to control the mass flow of air therethrough for a particular application.

The advantage offered by this form of construction of a perforated sheet 10 is that the apertures 12a and 12b, in each layer 14 and 16 respectively, are independently formed to produce a passageway 12. In this way the apertures 12a and 12b in each layer 14 and 16 can be easily machined to the desired size, shape and angle to optimise cooling film effectiveness and airflow control for any particular application.

In the embodiments described single apertures in each layer are shown in communication with one another, however it will be appreciated by one skilled in the art that each of the apertures 12a in the first laminate layer 14 may be in communication with a corresponding aperture 12b in the second laminate layer 16 which divides into a plurality of apertures.

I claim:

1. A perforated sheet for the promotion of film cooling, the perforated sheet defining a surface of a gas turbine engine and comprising,
   a first and a second layer of laminate material,
   the first and second layers each having a plurality of apertures therein, with each of said apertures having an inlet and an outlet,
   the first and second layers being in superposed abutting relationship so that the outlet of each of the apertures in the first layer is conterminous wit and in direct fluid communication with at least one of the inlets of the apertures in the second layer to form passageways extending completely through the perforated sheet with a surface to be cooled being disposed on a side of said second layer to which said outlets to said apertures open,
   the cross-sectional area of each of the apertures in the second layer being larger than the cross-sectional area of the aperture in the first layer with which it corresponds.

2. A perforated sheet as claimed in claim 1 in which the apertures in the first and second layers of laminate material have parallel sides.

3. A perforated sheet as claimed in claim 1 in which the first and second layers of laminate material are of different thickness.

4. A perforated sheet as claimed in claim 1 in which the first and second layers of laminate material are bonded together to give good thermal conduction between them.

5. A perforated sheet as claimed in claim 1 in which the apertures in the first layer of laminate material are angled for controlling a main flow of cooling fluid therethrough.

6. A perforated sheet as claimed in claim 1 in which the apertures in the second layer of laminate material are angled for controlling a discharge angle material are angled for controlling a discharge angle of cooling fluid flowing therethrough.

7. A perforated sheet as claimed in claim 1 for use in forming a combustion chamber wall of a gas turbine engine.

8. A perforated sheet as claimed in claim 1 wherein the apertures in the first layer of laminate material are angled for directing a flow of cooling fluid which passes therethrough onto the outlet side of at least one of the apertures in the second layer of laminate material to provide impingement cooling of the second layer of laminate material.

9. A method of making a perforated sheet for the promotion of film cooling, the perforated sheet defining a surface of a gas turbine engine, comprising the steps of,
   producing a plurality of apertures of given cross-sectional areas in a predetermined pattern in a first layer of laminate material, with each of said apertures having an inlet and an outlet with said first layer being free of obstructions between said apertures,
   producing a plurality of apertures in a corresponding pattern in a second layer of a laminate material, the apertures in the second layer each having an inlet and an outlet and being larger in cross-sectional areas than corresponding apertures in the first layer, said second layer including a surface to be cooled disposed on a side thereof where the outlets are formed, placing the two layers of laminate material in superposed abutting relationship so that the outlet of each of the apertures in the first layer is contermi-nous and in direct fluid communication with at least one of inlets to the corresponding apertures in the second layer to form passageways extending completely through the perforate sheet.

* * * * *